Feb. 3, 1953 F. K. ZERBE 2,627,361
PRESSURE VESSEL CLOSURE SEAL
Filed Sept. 12, 1949
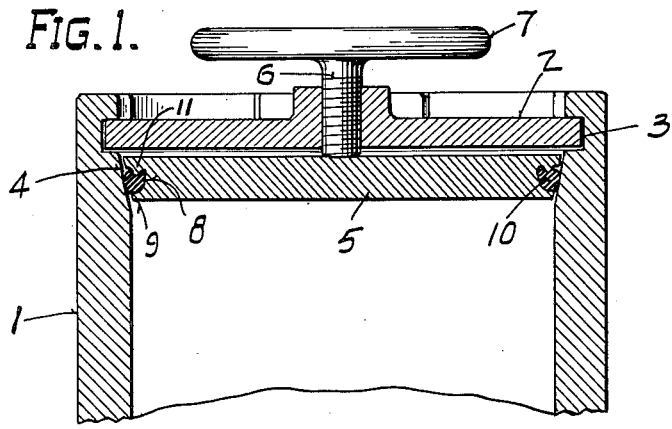
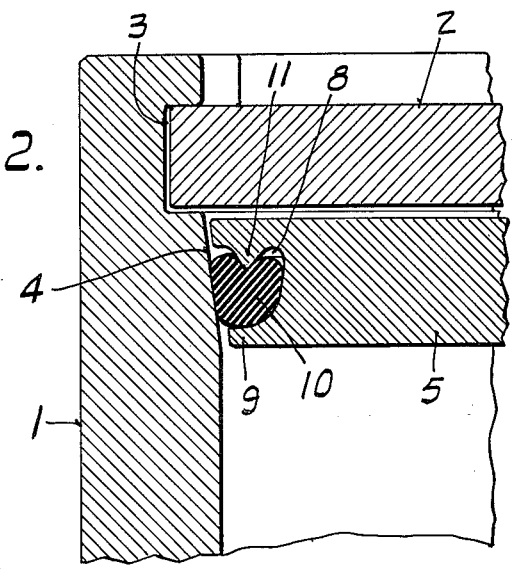
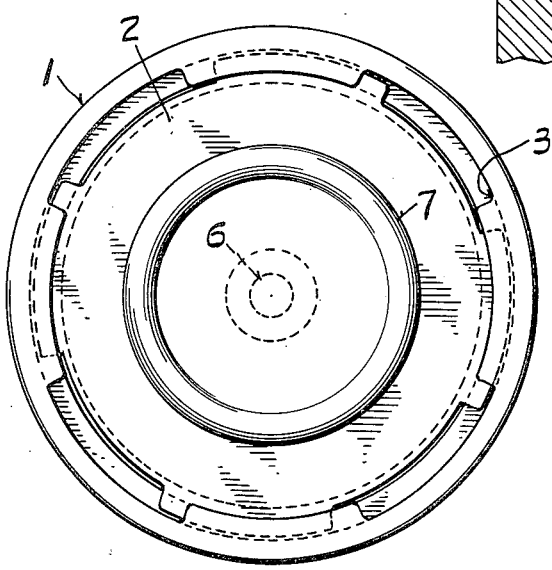
INVENTOR.
Frederick K. Zerbe
BY Andrus & Seales
ATTORNEYS.

UNITED STATES PATENT OFFICE 2,627,361

PRESSURE VESSEL CLOSURE SEAL

Frederick K. Zerbe, Houston, Tex., assignor to A. O. Smith Corporation, Milwaukee, Wis., a corporation of New York Application September 12, 1949, Serial No. 115,244

2 Claims. (Cl. 220—46)

This invention relates to a vessel closure seal and more particularly to quick opening closures for vessels which may be required to withstand either substantial external or internal pressure in the course of their use.

An object of this invention is to provide a closure that may be quickly opened or closed without the necessity of assembling or disassembling a complicated arrangement of parts.

Another object of the invention is to provide an effective closure that is contained almost wholly within the dimensional limits of the vessel itself thereby eliminating external projections that interfere with orderly storage of vessels, and to give a more streamlined appearance to the closed vessel.

Another object of the invention is to provide a sealing member and seat construction whereby the member will be additionally compressed into a sealing position by either external or internal pressures.

The invention consists, generally, of the compression of a sealing or gasket member between a closure plate and the inclined wall of a pressure vessel by distorting the shape of the sealing member as the result of a projection from the surface of the closure plate adjacent thereto and by directly exposing the sealing member to any pressure within the vessel. A seal is thus created at points of contact of the sealing member with the vessel wall and the closure plate.

The invention is illustrated in the accompanying drawing in which:

Figure 1 is a longitudinal sectional view of a pressure vessel closure;

Fig. 2 is an enlarged detail sectional view of the closure of Fig. 1; and

Fig. 3 is a top plan view of the vessel closure.

Referring to the drawing, the closure is shown as employed with a cylindrical pressure vessel formed of shell 1 closed at its lower end, not shown, and having a removable head 2 which closes the upper end of the vessel.

Head 2 has peripherally spaced lugs for registry in annular slot 3 provided in the inner wall of shell 1, adjacent the upper end thereof. Fig. 3 shows the head 2 partially rotated in slot 3 and approaching a breach locked position.

The inner wall of shell 1, approaching slot 3 tapers outwardly as at 4.

Closure plate 5, which is formed with a periphery substantially complementary to tapered portion 4 of the inner wall of shell 1, is disposed inwardly of head 2.

Screw 6 is threaded through a thickened central portion of head 2 and the inner end of the screw engages closure plate 5 to force the same inwardly as the screw is tightened by hand wheel 7 provided on the outer end thereof, thereby accomplishing the sealing of the end of the vessel, as will be described.

A circumferential groove 8 is formed in the periphery of closure plate 5. Lip 9, provided on the inner end of plate 5 by the forming of groove 8, is spaced from the wall of shell 1 to expose the groove to any internal pressures developed in the vessel by contained fluid.

Gasket 10, of suitable sealing material, is confined within groove 8 and in engagement with the tapered portion 4 of the inner wall of shell 1. Gasket 10 is normally round in cross-section.

A projecting wedge 11 depends axially inwardly of the vessel from closure plate 5 into groove 8 for the full circumference of the plate and engages gasket 10 to distort the same in service thereby providing a seal at points of contact between gasket 10 and the vessel wall.

The spacing of lip 9 from the inner wall of shell 1 causes internal pressures to encourage the distortion of gasket 10 by wedge 11, thereby further insuring the seal.

The pressing of gasket 10 against the inclined wall 4 and lip 9 by external pressure, as when there is a partial vacuum within the vessel, effects the seal under alternate pressure conditions.

The closure illustrated is of a simple construction, is easily assembled and disassembled and affords an effective seal against either external or internal pressures.

Various embodiments of the invention may be employed within the scope of the following claims:

1. A quick opening closure for a pressure vessel having an outwardly tapered inner wall near the end thereof, a closure plate fitting within the end of said vessel and having a periphery tapered generally complementary to said vessel wall and spaced therefrom with a circumferential groove extending in said periphery, a pliable, ring-shaped sealing member confined in said groove and exposed to the fluid contained in said vessel between the wall of the vessel and the periphery of the closure, an annular projection extending axially of the vessel from the outermost wall of the groove toward the interior of the vessel and lying within said groove in engagement with said sealing member to press the same tightly against the tapered wall of the vessel upon any tendency of the sealing member to move outwardly under internal fluid pressures, and means for holding said closure plate within the end of said vessel.

2. A quick opening closure for a pressure vessel having an outwardly tapered inner wall near the end thereof, a closure plate fitting within the end of said vessel and having a periphery tapered generally complementary to said vessel wall and radially spaced from the vessel wall with an annular groove extending circumferentially in the periphery of said cover, a generally round pliable gasket extending in said groove circumferentially of said closure plate and in engagement with the tapered wall of the vessel with said gasket being exposed to the fluid contained in the vessel through the space provided between the wall of the vessel and the periphery of the closure plate, and an annular projection extending axially of the vessel from the outermost wall of the groove toward the interior of the vessel and lying within said groove in engagement with said gasket to distort the gasket and force the latter against the tapered surface of the vessel wall as pressure from the contained fluid tends to force the gasket axially outwardly of the vessel, and means for holding the closure plate within the end of the vessel.

FREDERICK K. ZERBE.

REFERENCES CITED

The following references are of record in the file of this patent:

UNITED STATES PATENTS

| Number | Name | Date |
| --- | --- | --- |
| 590,584 | McKeone | Sept. 28, 1897 |
| 1,493,058 | Wacker | May 6, 1924 |
| 1,520,784 | Taylor | Dec. 30, 1924 |
| 1,566,983 | Sheriff | Dec. 22, 1925 |
| 1,683,726 | Pierce | Sept. 11, 1928 |
| 1,846,648 | Lobl | Feb. 23, 1932 |
| 2,209,081 | Rocic | July 23, 1940 |
| 2,375,671 | Malluk | May 8, 1945 |
| 2,401,856 | Brock | June 11, 1946 |